(12) United States Patent
Metivier et al.

(10) Patent No.: US 10,815,258 B2
(45) Date of Patent: Oct. 27, 2020

(54) PHOSPHINE OXIDES REDUCTION

(71) Applicant: RHODIA OPERATIONS, Paris (FR)

(72) Inventors: Pascal Metivier, Shanghai (CN); Peng Li, Shanghai (CN)

(73) Assignee: RHODIA OPERATIONS, Paris (FR)

( * ) Notice: Subject to any disclaimer, the term of this patent is extended or adjusted under 35 U.S.C. 154(b) by 371 days.

(21) Appl. No.: 15/758,840

(22) PCT Filed: Sep. 8, 2016

(86) PCT No.: PCT/CN2016/098401
§ 371 (c)(1),
(2) Date: Mar. 9, 2018

(87) PCT Pub. No.: WO2017/041723
PCT Pub. Date: Mar. 16, 2017

(65) Prior Publication Data
US 2020/0231613 A1    Jul. 23, 2020

(30) Foreign Application Priority Data
Sep. 9, 2015 (WO) ................ PCT/CN2015/089254

(51) Int. Cl.
*C07F 9/00* (2006.01)
*C07F 9/50* (2006.01)

(52) U.S. Cl.
CPC .................................... *C07F 9/509* (2013.01)

(58) Field of Classification Search
CPC ...................................................... C07F 9/509
See application file for complete search history.

(56) References Cited

FOREIGN PATENT DOCUMENTS

CN    103342719 A    10/2013
WO    2011123037 A1   10/2011

OTHER PUBLICATIONS

Wu, Haichen et al. "stereospecific deoxygenation of phosphine oxides with retention of configuration using triphenylphosphine or triethyl phosphite as an oxygen acceptor," Organic Letters, vol. 6, No. 25, Nov. 11, 2004 (Nov. 11, 2004), pp. 4675-4678 see table 2, p. 4677.

*Primary Examiner* — Sikarl A Witherspoon

(57) ABSTRACT

Provided is a process for the conversion of a tertiary phosphine oxide to the corresponding tertiary phosphine, comprising at least reacting said tertiary phosphine oxide with a phosphite compound, in the presence of at least a catalyst. Furthermore, provided is a composition comprising at least a tertiary phosphine oxide and a phosphite compound, and optionally a catalyst.

18 Claims, No Drawings

PHOSPHINE OXIDES REDUCTION

This application is a U.S. national phase entry under 35 U.S.C. § 371 of International Application No. PCT/CN2016/098401, filed on Sep. 8, 2016, which claims priority to International Application No. PCT/CN2015/089254, filed on Sep. 9, 2015. The entire contents of these applications are explicitly incorporated herein by this reference.

The present invention relates to a process for the conversion of a tertiary phosphine oxide to the corresponding tertiary phosphine, comprising at least reacting said tertiary phosphine oxide with a phosphite compound, in the presence of at least a catalyst. The invention also concerns a composition comprising at least: a tertiary phosphine oxide and a phosphite compound, and optionally a catalyst.

PRIOR ART

The following discussion of the prior art is provided to place the invention in an appropriate technical context and enable the advantages of it to be more fully understood. It should be appreciated, however, that any discussion of the prior art throughout the specification should not be considered as an express or implied admission that such prior art is widely known or forms part of common general knowledge in the field.

Phosphines, the phosphorous analogues of organic amines, constitute a class of highly important compounds with widespread industrial applicability within numerous areas. Tertiary phosphines are involved in a variety of extensively utilized chemical reactions. Additionally, phosphines are widely used in organocatalysis and as ligands in homogenous catalysis. Tertiary phosphines are commonly prepared through reduction of the corresponding phosphine oxides. Over the years, concomitantly with the realization that tertiary phosphines are highly versatile and useful compounds for various applications, numerous different processes for the preparation of these organophosphorous agents have been developed. However, virtually all chemical processes for preparing tertiary phosphines suffer from one or more disadvantages, relating to for instance cost, reagent handling, high reaction temperature intervals, severe purification requirements, or significant environmental impact, as well as the inherent complexity of the reaction system. Polymeric analogues of triphenylphosphine have, inter alia, been reported as a means to mitigate the problem with extensive purification, enabling simple filtration-based removal of the undesired product of a particular chemical reaction. However, despite being an elegant solution to the purification problem, issues associated with high reagent cost and substantial water requirements decrease the utility of said strategy.

Further, numerous teachings of the prior art relate to procedures with low susceptibility for industrial application, relatively often as an implication of a lack of scalability, or as a result of the use of harsh reagents, obstructing safe and environmentally feasible process development.

INVENTION

There is thus a significant need in the art for improved processes for conversion of tertiary phosphine oxides into the corresponding tertiary phosphines, with desired characteristics such as for instance inexpensiveness, simplicity, scalability, ease of handling, and efficiency, high yield and conversion, as well as low environmental impact. Bearing in mind the substantial drawbacks associated with the processes constituting the state of the art, it is an object of the present invention to overcome said drawbacks and to satisfy the existing needs, by providing an inexpensive, simple, and highly efficient chemical process with minimal environmental impact.

According to a first aspect, the present invention therefore pertains to an optimized process for converting tertiary phosphine oxides into the corresponding tertiary phosphines, utilizing a completely novel approach to the phosphine oxide reduction.

Thus, the present invention relates to a process for the conversion of a tertiary phosphine oxide to the corresponding tertiary phosphine, comprising at least reacting said tertiary phosphine oxide with a phosphite compound, in the presence of at least a catalyst. The invention also concerns a tertiary phosphine susceptible to be obtained by the process as described above.

The invention also concerns the use of a phosphite compound for reducing a tertiary phosphine oxide by reacting said tertiary phosphine oxide with a phosphite compound in the presence of a catalyst.

The present invention also relates to a composition comprising at least: a tertiary phosphine oxide and a phosphite compound, and optionally a catalyst.

Further, the invention pertains to numerous embodiments related to said conversion process, as well as to various uses for this highly efficient, simple, environmentally friendly, and scalable process.

The stable, inexpensive phosphite reagents used and the simple, mild reaction conditions make it a quite potent method for recycle use of expensive phosphine reagents, and give an effective alternative for the usually sensitive phosphine ligands synthesis.

Other characteristics, details and advantages of the invention will emerge even more fully upon reading the description which follows.

Definitions

Throughout the description, including the claims, the term "comprising one" should be understood as being synonymous with the term "comprising at least one", unless otherwise specified, and "between" should be understood as being inclusive of the limits.

As used herein, the terminology "$(C_n\text{-}C_m)$" in reference to an organic group, wherein n and m are each integers, indicates that the group may contain from n carbon atoms to m carbon atoms per group.

The term "hydrocarbyl" as used herein refers to a moiety consisting exclusively of carbon and hydrogen atoms. As defined herein, the hydrocarbyl moiety is branched or linear and is aliphatic. The hydrocarbyl moiety may contain one or several unsaturations, i.e. one or several double bonds or one or several triple bonds, or both. The moiety may comprise 1 to 20 carbon atoms, such as 1 to 10 carbon atoms, notably 1 to 6 carbon atoms.

A substituted hydrocarbyl may carry one or several independently selected substituents and any substituent that does not interfere with the reduction reaction is considered as possible for the purpose of the present invention. It is considered that the person of ordinary skill in the art will be able to ascertain the suitability of a substituent without undue burden. For example, any substituent may be independently selected from substituted or unsubstituted carbocyclyl, substituted or unsubstituted heterocyclyl, halogen, hydroxy, thio, alkylthio, e.g. $C_1\text{-}C_{10}$ alkylthio, alkoxy, e.g. $C_1\text{-}C_{10}$ alkoxy, cyano, haloalkyl, etc.

The term "carbocyclyl" as used herein refers to a cyclic moiety consisting exclusively of carbon and hydrogen atoms. As defined herein, the carbocyclyl moiety may be aliphatic or aromatic and monocyclic or polycyclic, e.g. bicyclic, tricyclic or tetracyclic, including bridged or fused cycles, as well as spiro cycles. An aliphatic carbocyclyl may contain one or several unsaturations, i.e. one or several double bonds or one or several triple bonds, or both. The moiety may comprise 3 to 20 carbon atoms. For example, the hydrocarbyl moiety may be polycyclic and contain e.g. 10 to 20 carbon atoms or monocyclic and contain e.g. 3 to 8 carbon atoms. Examples of carbocyclyl are cyclopropyl, cyclo butyl, cyclopentyl, cyclopentenyl, cyclopentadienyl, cyclohexyl, cyclohexenyl, cyclohexadienyl, norbornyl, bicyclo[2.2.2]octyl, phenyl, naphthyl, fluorenyl, azulenyl, indanyl, indenyl, anthryl etc.

A substituted carbocyclyl may carry one or several independently selected substituents and again it is considered that any substituent that does not interfere with the reduction reaction is possible, and that the person of ordinary skill in the art will be well able to ascertain the suitability of the substitution without undue burden, e.g. by following the general procedure described herein for reduction of the tertiary phosphine oxide into the corresponding tertiary phosphine, and by usual analytical techniques to ascertain the product identity and the product yield. For example, any substituent may be independently selected from substituted or unsubstituted hydrocarbyl, carbocyclyl or heterocyclyl, halogen, hydroxy, thio, alkylthio, e.g. $C_1$-$C_{10}$ alkylthio, alkoxy, e.g. $C_1$-$C_{10}$ alkoxy, cyano, haloalkyl, etc.

The term "heterocyclyl" as used herein refers to a monocyclic or polycyclic, e.g. bi-, tri- or tetracyclic radical having 3 to 20 ring atoms, at least one of which, e.g. 1, 2, 3 or 4, such as 1 or 2, is a heteroatom selected from nitrogen, oxygen, phosphorus, silicon and sulphur, e.g. nitrogen, oxygen and sulphur. The cyclic radical may contain one or several unsaturations, i.e. one or several double bonds or one or several triple bonds, or both. Examples of heterocyclyl are pyridyl, pyrrolyl, quinolinyl, furyl, thienyl, oxadiazolyl, thiadiazolyl, thiazolyl, oxazolyl, pyrazolyl, triazolyl, tetrazolyl, tetrahydroquinolinyl, tetrazolyl, thiadiazolyl, thiazolyl, thiochromanyl, triazolyl, isoxazolyl, isothiazolyl, isoquinolinyl, naphthyridinyl, imidazo lyl, pyrimidinyl, phthalazinyl, indolyl, pyrazolyl, pyridazinyl, pyrimidinyl, pyrrolyl, quinazolinyl, quinolinyl, quinolizinyl, quinoxalinyl, tetrahydroisoquinolinyl, pyrazinyl, indazolyl, indolinyl, indolyl, pyrimidinyl, thiophenetyl, pyranyl, chromanyl, cinnolinyl, quinolinyl, benzimidazolyl, benzodioxanyl, benzodioxepinyl, benzodioxolyl, benzofuryl, benzothiazolyl, benzoxadiazolyl, benzothiazolyl, benzoxazinyl, benzoxazolyl, benzimidazolyl, benzomorpholinyl, xanthenyl, phenoxathiinyl, phenazinyl, carbazolyl, acridinyl, carbolinyl, phenoxazinyl, benzoselenadiazolyl, benzothienyl, purinyl, cinnolinyl, pteridinyl, aziridinyl, phenantridinyl, azetidinyl, dihydropyranyl, dihydropyridyl, dihydropyrrolyl, dioxolanyl, dioxanyl, dithianyl, dithiolanyl, imidazolidinyl, imidazolinyl, morpholinyl, oxetanyl, oxiranyl, pyrrolidinyl, pyrrolidinonyl, piperidyl, piperazinyl, piperidinyl, pyranyl, pyrazolidinyl, quinuclidinyl, sulfalonyl, 3-sulfolenyl, tetrahydrofuryl, tetrahydropyranyl, tetrahydropyridyl, thietanyl, thiiranyl, thiolanyl, thiomorpholinyl, trithianyl, tropanyl etc.

A substituted heterocyclyl may carry one or several independently selected substituents and again it is considered that any substituent that does not interfere with the reduction reaction is possible, and that the person of ordinary skill in the art will be well able to ascertain the suitability of the substitution without undue burden. For example, any substituent may be independently selected from substituted or unsubstituted hydrocarbyl, carbocyclyl or heterocyclyl, halogen, hydroxy, thio, alkylthio, e.g. $C_1$-$C_{10}$ alkylthio, alkoxy, e.g. $C_1$-$C_{10}$ alkoxy, cyano, haloalkyl, etc.

It should be noted that a chemical moiety that forms part of a larger compound may be described herein using a name commonly accorded it when it exists as a single molecule or a name commonly accorded its radical. For example, the terms "pyridine" and "pyridyl" are accorded the same meaning when used to describe a moiety attached to other chemical moieties.

The terms "halogen" or "halo", as used herein usually refer, to F, Cl, Br and I.

The term "alkyl", as used herein, refers to a hydrocarbyl radical. In case the alkyl is saturated, it is a radical according to the formula $C_nH_{2n-1}$, and then is referred to as a "$C_n$ alkyl". Further, it should be understood that a moiety such as "$C_3$-$C_{20}$ cycloalkyl-$C_0$ alkyl" or "$C_6$-$C_{20}$ aryl-$C_0$ alkyl" represents a "$C_3$-$C_{20}$ cycloalkyl" and "$C_6$-$C_{20}$ aryl", respectively.

As defined herein, the alkyl also may be unsaturated (i.e. alkenyl or alkynyl), in which case it may contain one or several double bonds or one or several triple bonds, or both. Examples of alkenyl groups include, but are not limited to, ethenyl, propenyl, n-butenyl, i-butenyl, 3-methylbut-2-enyl, n-pentenyl, heptenyl, octenyl, decenyl, and the like.

The term "aryl" as used herein includes reference to a carbocyclyl as defined herein above that is aromatic. Aryl is often phenyl but also may be a polycyclic ring system, having two or more rings, e.g. naphthyl, fluorenyl, azulenyl, anthryl, phenanthryl, etc. Aryl groups may also be fused or bridged with alicyclic or heterocyclic rings that are not aromatic so as to form a polycycle, such as tetralin.

The terms "hydrocarbylene", "carbocyclylene", "heterocyclylene", "alkylene" and "arylene" as used herein, refer to diradicals derived from the corresponding hydrocarbon, carbocycle, heterocycle, alkane (or alkene or alkyne, when insaturated) or arene, and are essentially analogous to the corresponding monoradicals defined herein, except for being diradicals.

The terms "phosphite compound" as used herein, refer to a compound derived from phosphorous acid, $H_3PO_3$, such as a phosphite ester, an organophosphorus compound with the formula $P(OR)_3$.

DETAILS OF THE INVENTION

The Tertiary Phosphine Oxide and the Tertiary Phosphine Product

It should be realized that the process of the invention is not limited to any particular tertiary phosphine oxide and in fact, it is contemplated that any tertiary phosphine oxide may be reduced by the inventive process, notably by a proper selection of the phosphite compound.

The tertiary phosphine oxide of the invention may contain any number of phosphine oxide functions to be reduced. For example, the tertiary phosphine oxide may contain from 1 to 3, e.g. 1 or 2 phosphine oxide functions. In one embodiment, the tertiary phosphine oxide contains 1 phosphine oxide function. In another embodiment, the tertiary phosphine oxide contains 2 phosphine oxide functions.

Furthermore, it is contemplated that the phosphine oxide may additionally contain other functional groups, such as halogen, nitro, amino, cyano, ether, thioether, or alkylene group.

The tertiary phosphine oxide of the invention may notably be a compound of formula (I) as follows:

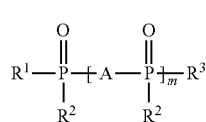

wherein $R^1$, $R^2$ and $R^3$ are each independently selected from the group comprising substituted or unsubstituted, branched or linear hydrocarbyl; and substituted or unsubstituted carbocyclyl or heterocyclyl; A is a linking moiety; m is an integer of 0 to 2, preferably 0, 1 or 2.

For example, each $R^1$, $R^2$ and $R^3$ may be independently selected from the group comprising $C_1$-$C_{20}$ alkyl, $C_6$-$C_{20}$ aryl-$C_o$-$C_{20}$ alkyl, $C_3$-$C_{20}$ cycloalkyl-$C_o$$C_{20}$ alkyl, 5-20 membered heterocyclyl-$C_0$-$C_{20}$ alkyl; 5-20 membered heteroaryl-$C_0$-$C_{20}$ alkyl wherein any alkyl, cycloalkyl and heterocyclyl moiety may be saturated or unsaturated, any alkyl moiety may be branched or linear, and any alkyl, cycloalkyl, heterocyclyl, aryl and heteroaryl moiety is optionally substituted with one or several substituents.

In one embodiment, in a compound of formula (I), any $C_1$-$C_{20}$ alkyl may more particularly be a $C_1$-$C_{10}$ alkyl; any $C_o$-$C_{20}$ alkyl may more particularly be a $C_o$-$C_{10}$ alkyl; any $C_6$-$C_{20}$ aryl may more particularly be a $C_6$-$C_{14}$ aryl; any 5-20 membered heterocyclyl may more particularly be a 5-14 membered heterocyclyl; and any 5-20 membered heteroaryl may more particularly be a 5-14 membered heteroaryl.

In one embodiment, in a compound of formula (I), any $C_1$-$C_{20}$ alkyl may more particularly be a $C_1$-$C_6$ alkyl; any $C_o$-$C_{20}$ alkyl may more particularly be a $C_o$-$C_6$ alkyl; any $C_6$-$C_{20}$ aryl may more particularly be a $C_6$-$C_{10}$ aryl; any 5-20 membered heterocyclyl may more particularly be a 5-10 membered heterocyclyl; and any 5-20 membered heteroaryl may more particularly be a 5-10 membered heteroaryl.

For example, $R^1$, $R^2$ and $R^3$ may be each independently selected from the group comprising substituted or unsubstituted $C_6$-$C_{20}$ aryl-$C_o$-$C_{20}$ alkyl and $C_5$-$C_{20}$ heteroaryl-$C_o$-$C_{20}$ alkyl, e.g. substituted or unsubstituted $C_6$-$C_{20}$ aryl and $C_5$-$C_{20}$ heteroaryl, such as substituted or unsubstituted phenyl, naphthyl and furyl, in particular substituted or unsubstituted phenyl.

More particularly, $R^1$, $R^2$ and $R^3$ may be each independently selected from the group comprising substituted or unsubstituted $C_6$-$C_{20}$ aryl-$C_0$-$C_{20}$ alkyl, e.g. substituted or unsubstituted $C_6$-$C_{20}$ aryl, such as substituted or unsubstituted phenyl or naphthyl, in particular substituted or unsubstituted phenyl.

In one embodiment, $R^1$, $R^2$ and $R^3$ are all substituted or unsubstituted phenyl.

The linking moiety A may be any diradical capable of attaching the two phosphorous atoms of the phosphine (oxide) functions to each other, through any number of intervening bonds. The linking moiety A may comprise substituted or unsubstituted hydrocarbylene or substituted or unsubstituted monocyclic or polycyclic carbocyclylene or heterocyclylene, and optionally one or several functional groups, such as ether or thioether function.

When m in formula (I) is more than 1, A is independently selected at each occurrence.

In one embodiment, A is a polycyclic diradical, such as a diradical comprising 2 to 8 ring moieties, e.g. 2 to 6, or 2 to 4 ring moieties, wherein each ring moiety is independently selected from 5- or 6-membered, saturated or unsaturated, aromatic or non-aromatic carbocycles and hetercycles, and wherein the ring moieties are either fused to each other or attached to each other through one or several intervening bonds of e.g. covalent type or metallocene type, such as a covalent bond, an ether function, a thioether function, an optionally substituted alkylene group, e.g. a methylene or ethylene group, or a ferrocene type bond. In this embodiment, the two phosphine oxide functions preferably are attached to different ring moieties.

In another embodiment, A may be a substituted or unsubstituted hydrocarbylene, carbocyclylene, or heterocyclylene. The linking moiety A also may be a substituted or unsubstituted metallocenylene, i.e. a diradical derived from a metallocene, i.e. a compound with the general formula $(C_5H_5)_2M$ consisting of two cyclopentadienyl anions bound to a positively charged metal centre (M). As an example, A may be a substituted or unsubstituted ferrocenylene.

In one embodiment, A is an unsubstituted or substituted diradical selected from the group of substituted or unsubstituted, saturated or unsaturated, branched or linear $C_1$-$C_{20}$ alkylene, $C_3$-$C_{20}$ carbocyclylene, e.g. $C_6$-$C_{20}$ arylene, 5-20 membered heterocyclylene, e.g. 5-20 membered heteroarylene, $C_6$-$C_{40}$ bicyclylene, e.g. $C_{12}$-$C_{40}$ biarylene, 10-40 membered biheterocyclylene, e.g. 10-40 membered biheteroarylene, and $C_{10}$-$C_{30}$ ferrocenylene.

For example, A may be an unsubstituted or substituted diradical selected from the group of $C_6$-$C_{20}$ arylene, 5-20 membered heterocyclylene, 5-20 membered heteroarylene, $C_{12}$-$C_{40}$ biarylene, 10-40 membered biheterocyclylene, 10-40 membered biheteroarylene, and $C_{10}$-$C_{30}$ ferrocenylene.

In one embodiment, A is an unsubstituted or substituted diradical selected from the group of $C_{12}$-$C_{40}$ biarylene, 5-20 membered heterocyclylene and $C_{10}$-$C_{30}$ ferrocenylene, e.g. binaphthyl, such as 2,2'-binaphthyl; xanthenylene, e.g. 4,5-xanthenylene; and $(C_{10})$ ferrocenylene, e.g. 1,1'-ferrocenylene.

Examples of tertiary phosphine oxides that may be reduced according to the invention are triphenylphosphine oxide, trioctylphosphine oxide, tris(4-methoxyphenyl)phosphine oxide, tris(4-methylphenyl)phosphine oxide, tris(4-fluorophenyl)phosphine oxide, cyclohexyldiphenylphosphine oxide, 1,2-bis(diphenylphosphinoyl)ethane dioxide, 2,2'-bis(diphenyloxyphosphino)-1,1'-binaphthyl, bis(2-(diphenyloxyphosphino) phenyl ether, 9,9-dimethyl-4,6-bis(diphenyloxyphosphino) xanthene, 1,1'-bis(diphenyloxyphosphino) ferrocene, (azanediylbis(ethane-2,1-diyl))bis (diphenylphosphine oxide), tris(4-chlorophenyl) phosphineoxide, bis(2-methylphenyl) phenylphosphineoxide, bis(2-methylphenyl) phenylphosphineoxide, (4-cyanophenyl)diphenylphosphine oxide, or any of these compounds attached to a solid and/or polymeric support.

It has to be outlined that the compounds of the invention may include one or several atoms having an (R) form and (S) form, in which case all forms and combinations thereof are contemplated as included within the scope of the invention, as well as any mixture of any isomers.

The Reducing Phosphite Compound

The reducing phosphite compound may comprise at least one phosphite function, such as for instance a secondary phosphite function and/or a tertiary phosphite function. The phosphite compound of the invention may comprise at least one or several secondary phosphite function and/or one or several tertiary phosphite functions. The phosphorus atom of each phosphite function may be linked to groups selected from substituted or unsubstituted, branched or linear hydrocarbyl; and substituted or unsubstituted carbocyclyl or heterocyclyl, as defined herein above.

For example, the phosphite compound may contain from 1 to 3 phosphite functions. In one embodiment, the phosphite compound contains 1 or 2 phosphite functions. In one particular embodiment, the phosphite compound is a tertiary phosphite that contains 1 phosphite function.

Furthermore, it is contemplated that the phosphite compound may additionally contain other functional groups, such as for instance halogen, nitro, amino, cyano, ether, thioether or alkylene group.

In one embodiment, the phosphite compound is represented by the formula (II) as follows:

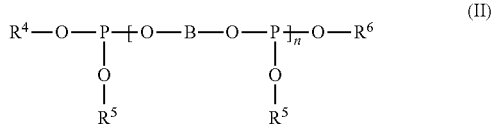

(II)

wherein $R^4$, $R^5$ and $R^6$ are each independently selected from the group comprising: hydrogen, substituted or unsubstituted, branched or linear hydrocarbyl; and substituted or unsubstituted, aliphatic or aromatic carbocyclyl or heterocyclyl; B is a linking moiety; and n is an integer of from 0 to 2, such as 0 or 1.

Preferably, at least one of the $R^4$, $R^5$ and $R^6$ group is not a hydrogen atom.

For example, $R^4$, $R^5$ and $R^6$ may be independently selected from the group comprising: hydrogen atom, substituted or unsubstituted, branched or linear $C_1$-$C_{20}$ hydrocarbyl, e.g. $C_1$-$C_{10}$ hydrocarbyl, e.g. $C_1$-$C_6$ hydrocarbyl; and substituted or unsubstituted, aliphatic or aromatic $C_3$-$C_{20}$ carbocyclyl, e.g. $C_3$-$C_{10}$ carbocyclyl, or $C_3$-$C_6$ carbocyclyl, or 5-20 membered heterocyclyl, e.g. 5-10 membered heterocyclyl, or 5-6 membered heterocyclyl.

In one embodiment, $R^4$, $R^5$ and $R^6$ are independently selected from the group comprising: hydrogen atom, substituted or unsubstituted, branched or linear $C_1$-$C_{20}$ hydrocarbyl, e.g. $C_1$-$C_{10}$ hydrocarbyl, e.g. $C_1$-$C_6$ hydrocarbyl; and substituted or unsubstituted, aliphatic $C_3$-$C_{20}$ carbocyclyl, e.g. $C_3$-$C_{10}$ carbocyclyl, or $C_3$-$C_6$ carbocyclyl. For example, any hydrocarbyl moiety may be an alkyl and any carbocyclyl moiety may be a cycloalkyl.

More particularly, $R^4$, $R^5$ and $R^6$ may be each independently selected from the group comprising: hydrogen atom, substituted or unsubstituted $C_6$-$C_{20}$ aryl-$C_0$-$C_{20}$ alkyl, e.g. substituted or unsubstituted $C_6$-$C_{20}$ aryl, such as substituted or unsubstituted phenyl or naphthyl, in particular substituted or unsubstituted phenyl.

Preferably, the phosphite compounds are chosen in the group consisting of: phosphorous acid, triphenylphosphite, diphenylphosphite, phenylphosphite, diisodecylphenylphosphite, diphenylisodecylphosphite, disooctyloctylphenylphosphite, phenyldiisodecylphosphite, tris(4-methoxyphenyl)phosphite, tri(o-tolyl)phosphite, tris (nonylphenyl) phosphite, tetraphenyl dipropyleneglycol diphosphite, 4,4'-isopropylidenediphenol $C_{12}$-$_{15}$ alcohol phosphite and the like.

The phosphite compound is preferably present in an amount comprised between 1 and 10 molar equivalent phosphite of the phosphite compound to the phosphine oxide of the tertiary phosphine oxide, preferably between 2 and 6 molar equivalent phosphite.

For example, the phosphite compound may suitably be present in an amount such as the molar ratio of the phosphite function(s) of the phosphite compound to the phosphine oxide function(s) of the tertiary phosphine oxide to be reduced is from 1 to 10, e.g. from 1.5 to 8, e.g. from 2 to 6.

In one embodiment, the phosphite compound is attached to a solid support. In this embodiment, the phosphite compound may be regenerated after use, e.g. by reacting it with a reduction agent, such as $H_2$, $LiAlH_4$ and the like.

The Catalyst

The catalyst to be used in the present invention is a catalyst that catalyzes the conversion of a tertiary phosphine oxide to the corresponding tertiary phosphine. In accordance with the invention, the catalyst can be any type of chemical species capable of catalyzing the reaction of the invention. Preferably the catalyst comprises at least one halogen atom such as Cl, Br, I and F.

The catalyst may be selected from the group comprising fluorine ($F_2$), chlorine ($Cl_2$), bromine ($Br_2$), iodine ($I_2$), iodine monochloride (ICl), iodine monobromide (IBr), heterocyclyl halides, such as N-halosuccinimide, 1,3-dihalo-5,5-dimethylhydantoin, haloalkanes, in particular tetrahalomethanes, such as tetrachloromethane, tetrabromomethane, tetraiodomethane, tetrafluoromethane, phosphine dihalides, as tertiary phosphine dihalides, such as triphenylphosphine dichloride, triphenylphosphine dibromide, triphenylphosphine diiodide, triphenylphosphine difluoride, triphenylphosphine dichloride, and/or any trialkyl, cycloalkyl or aryl analogues thereof.

The catalyst loading may be comprised between 0.1 and 1 molar equivalents of the tertiary phosphine oxide to be reduced, in particular 0.2 and 0.6 molar equivalents, more preferably 0.3 and 0.5 molar equivalents.

In fact, increasing the amount of catalyst above the indicated ranges does not appear to have any significant effect on the reaction. However, depending on the utilized catalyst, higher/lower molar equivalents may be relevant, and increasing/decreasing the amount of catalyst is thus also within the scope of the present invention.

The catalyst may be present in any physical form, but suitable forms known to a person skilled in the art for a particular combination of reagents and/or reaction conditions are naturally preferable.

The Solid Support

Either the tertiary phosphine oxide and/or the phosphite compound may be attached to a solid support. An example of such a solid support is a polystyrene material, such as sold under the trade name JandaJel™, by Sigma-Aldrich Co. Other possible solid phase supports are e.g. silica gel, Ring-Opening Olefin Metathesis Polymerization (ROMP) gel etc.

The person of ordinary skill in the art will now of various other possible solid supports, such as those described e.g. in U.S. Pat. No. 7,491,779 to Steinke, et al., the contents of which are incorporated by reference.

The Reaction Medium

The process of converting the tertiary phosphine oxide into the corresponding phosphine may be performed under solvent-free conditions, in order to further reduce the environmental impact of the process. The process of the present invention has, by virtue of the selection of reagents and conditions under which the reaction is taking place, a remarkably low environmental impact, but the possibility to utilize solvent-free reaction conditions further optimizes the eco-friendly characteristics of the present invention.

The process may also be carried out in the presence of a non-polar solvent or an anhydrous aprotic polar solvent.

Anhydrous aprotic solvent(s) may be chosen in the group consisting of toluene, hexane, tetrahydrofuran (THF), 2-methyltetrahydrofuran, acetonitrile, diethylether, dioxane, propionitrile, benzonitrile, ethyl acetate and mixtures of these.

The reaction medium may also comprise water, notably with a molar ratio of water to tertiary phosphine oxide comprised between 1/1 and 10/1, preferably comprised between 1/1 and 2/1.

The process may also be carried out in the presence of a base. Said base is not particularly limited and could be organic or inorganic base. Organic base may notably be tertiary amine chosen from a group consisting of pyridine, trimethylamine, triethylamine, DIPEA(N,N-diisopropylethylamine) and DBU(1,8-diazabicyclo[5.4.0]undec-7-ene), DABCO (1,4-diazabicyclo[2.2.2]octane), DMP(2,5-dimethylpyridine). Inorganic base may be alkali metal hydroxide, such as sodium hydroxide, potassium hydroxide and alkali metal salt chosen from a group consisting of sodium carbonate, sodium bicarbonate, potassium carbonate and potassium bicarbonate.

The bases mentioned above could be used solely or in the form of a mixture.

The base might be preferably present in an amount comprised between 0.1 and 2 molar equivalents of the tertiary phosphine oxide to be reduced, in particular 0.2 and 1.0 molar equivalents, more preferably 0.3 and 0.8 molar equivalents.

Further, the process can be carried out in virtually any type of reaction vessel, additionally increasing the versatility, specifically from an industrial perspective, of the invention.

Other Features of the Inventive Process

The process of the invention very advantageously may be carried out at low reaction temperature, notably between 15 and 30° C. The process may be carried out under air or under an inert atmosphere, such as a nitrogen atmosphere. Very advantageously, the reaction time may be kept very short, notably between 2 and 6 hours.

The mixture may be stirred for the appropriate amount of time.

The reaction mixture may be quenched, notably by $H_2O$, brine or preferably saturated $NaHCO_3$.

The product may be then purified by an appropriate method known in the prior art such as extraction, crystallization, or filtration.

For example, in one embodiment, at the completion of the reaction, the reaction medium is diluted, if necessary, and washed with portions of a weak basic buffer solution, such as saturated $NaHCO_3$. The solution is dried, e.g. with $Na_2SO_4$ and filtered, whereafter the solvent is evaporated. The evaporation residue is redissolved in a hot solvent, e.g. EtOH, and made to crystallize, e.g. by keeping in a refrigerator. The product crystals then are filtered off, washed and dried.

The following examples are included to illustrate embodiments of the invention. Needless to say, the invention is not limited to described examples.

EXPERIMENTAL PART

Example 1

To a 100 mL three-necked flask was added 1.39 g (5 mmol) of triphenylphosphine oxide, 6.20 g (20 mmol) of triphenyl phosphite and 20 mL of anhydrous THF. 1.26 g (5 mmol) of $I_2$ was then introduced to the mixture. The mixture was stirred for 24 h at room temperature under nitrogen atmosphere provided by a nitrogen balloon.

Reaction is expressed as follows:

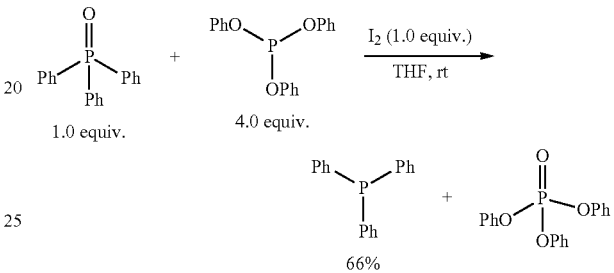

The reaction mixture was characterized by $^{31}P$ NMR spectroscopy and the conversion and yield were calculated based on the integrals.

Conversion of triphenylphosphine oxide: 69%

Yield of triphenylphosphine: 66%

Example 2

In a glove box, a 50 mL flask containing a stirring bar was charged with 1.39 g (5 mmol) of triphenylphosphine oxide, 6.20 g (20 mmol) of triphenyl phosphite, 20 mL of anhydrous THF, 0.63 g (2.5 mmol) of $I_2$ and 0.18 g of $H_2O$ (10 mmol) respectively. The mixture was stirred at room temperature overnight.

Reaction is expressed as follows:

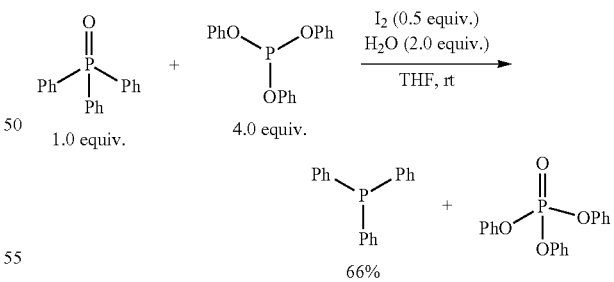

The reaction mixture was characterized by $^{31}P$ NMR spectroscopy and the conversion and yield were calculated based on the integrals.

Conversion of triphenylphosphine oxide: 75%

Yield of triphenylphosphine: 66%

Example 3

In a glove box, a 50 mL flask containing a stirring bar was charged with 1.39 g (5 mmol) of triphenylphosphine oxide, 4.68 g (20 mmol) of diphenyl phosphite, 20 mL of anhydrous THF and 0.63 g (2.5 mmol) of $I_2$ respectively. The mixture was stirred at room temperature for 18 h.

Reaction is expressed as follows:

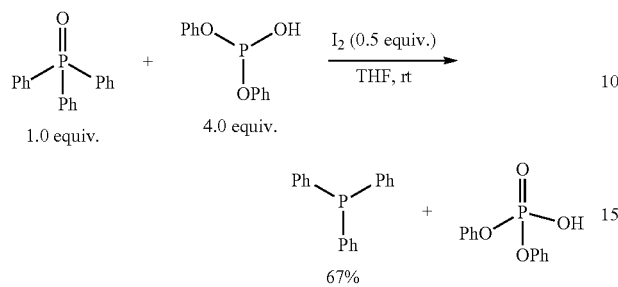

The reaction mixture was characterized by $^{31}P$ NMR spectroscopy and the conversion and yield were calculated based on the integrals.

Conversion of triphenylphosphine oxide: 82%

Yield of triphenylphosphine: 67%

Example 4

In a glove box, a 50 mL flask containing a stirring bar was charged with 1.39 g (5 mmol) of triphenylphosphine oxide, 2.34 g (10 mmol) of diphenylphosphite, 0.77 g (2.5 mmol) of triphenylphosphite, 20 mL of anhydrous THF and 0.63 g (2.5 mmol) of $I_2$ respectively. The mixture was stirred at room temperature for 18 h.

Reaction is expressed as follows:

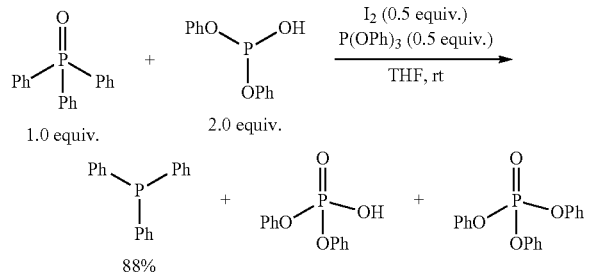

The reaction mixture was characterized by $^{31}P$ NMR spectroscopy and the conversion and yield were calculated based on the integrals.

Conversion of triphenylphosphine oxide: 91%

Yield of triphenylphosphine: 88%

Example 5

In a glove box, a 50 mL flask vial containing a stirring bar was charged with 1.39 g (5 mmol) of triphenylphosphine oxide, 2.34 g (10 mmol) of diphenylphosphite, 0.46 g (1.5 mmol) of triphenylphosphite, 20 mL of anhydrous THF and 0.38 g (1.5 mmol) of $I_2$ respectively. The mixture was stirred at room temperature for 20 h.

Reaction is expressed as follows:

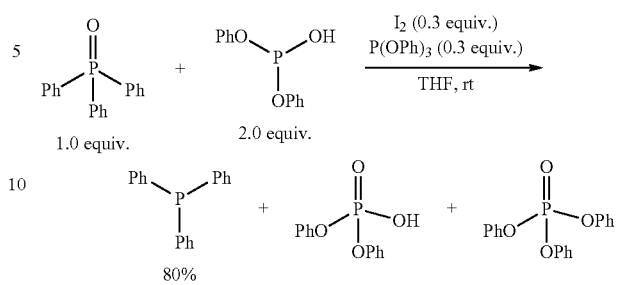

The reaction mixture was characterized by $^{31}P$ NMR spectroscopy and the conversion and yield were calculated based on the integrals.

Conversion of triphenylphosphine oxide: 86%

Yield of triphenylphosphine: 80%

Example 6

In a glove box, a 50 mL flask containing a stirring bar was charged with 1.39 g (5 mmol) of triphenylphosphine oxide, 2.34 g (10 mmol) of diphenylphosphite, 0.77 g (2.5 mmol) of triphenylphosphite, 20 mL of anhydrous THF and 0.63 g (2.5 mmol) of $I_2$ respectively. The mixture was stirred at room temperature for 5 h before it was quenched with 0.2 g of $H_2O$. The yield of triphenylphosphine was 89% in the mixture based on $^{31}P$ NMR spectroscopy. 5.7 g of colorless oil was obtained after concentrated under vacuum, which was further purified by flash chromatography to afford 1.06 g of a white solid (4.04 mmol, 81%).

Reaction is expressed as follows:

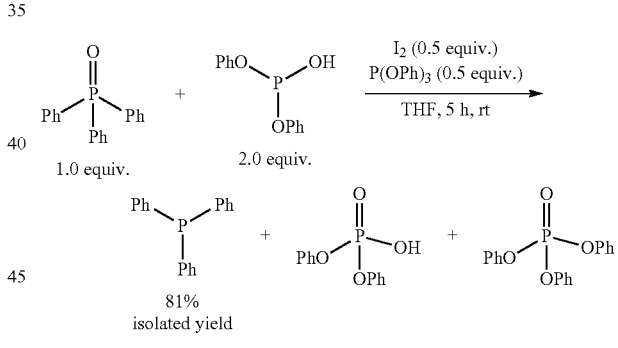

Example 7

In a glove box, a 50 mL flask containing a stirring bar was charged with 1.39 g (5 mmol) of triphenylphosphine oxide, 2.34 g (10 mmol) of diphenylphosphite, 0.323 g (2.5 mmol) of N,N-diisopropylethylamine, 20 mL of anhydrous THF and 0.63 g (2.5 mmol) of $I_2$ respectively. The mixture was stirred at room temperature for 5 h before it was quenched with 0.2 g of $H_2O$.

The reaction mixture was characterized by $^{31}P$ NMR spectroscopy and the conversion and yield were calculated based on the integrals.

Conversion of triphenylphosphine oxide: 87%.

Yield of triphenylphosphine: 85%.

Example 8

In a glove box, a 50 mL flask containing a stirring bar was charged with 1.39 g (5 mmol) of triphenylphosphine oxide, 2.34 g (10 mmol) of diphenylphosphite, 0.253 g (2.5 mmol) of triethylamine, 20 mL of anhydrous THF and 0.63 g (2.5 mmol) of $I_2$ respectively. The mixture was stirred at room temperature for 5 h before it was quenched with 0.2 g of $H_2O$.

The reaction mixture was characterized by $^{31}P$ NMR spectroscopy and the conversion and yield were calculated based on the integrals.

Conversion of triphenylphosphine oxide: 83%.
Yield of triphenylphosphine: 76%.

Example 9

In a glove box, a 50 mL flask containing a stirring bar was charged with 1.39 g (5 mmol) of triphenylphosphine oxide, 2.34 g (10 mmol) of diphenylphosphite, 0.190 g (1.25 mmol) of 1,8-diazabicyclo[5.4.0]undec-7-ene, 20 mL of anhydrous THF and 0.63 g (2.5 mmol) of $I_2$ respectively. The mixture was stirred at room temperature for 5 h before it was quenched with 0.2 g of $H_2O$.

The reaction mixture was characterized by $^{31}P$ NMR spectroscopy and the conversion and yield were calculated based on the integrals.

Conversion of triphenylphosphine oxide: 75%.
Yield of triphenylphosphine: 72%.

Example 10

In a glove box, a 50 mL flask containing a stirring bar was charged with 1.39 g (5 mmol) of triphenylphosphine oxide, 2.34 g (10 mmol) of diphenylphosphite, 20 mL of anhydrous THF and 0.562 g (2.5 mmol) of N-iodosuccinimide respectively. The mixture was stirred at room temperature for 6 h before it was quenched with 0.2 g of $H_2O$.

The reaction mixture was characterized by $^{31}P$ NMR spectroscopy and the conversion and yield were calculated based on the integrals.

Conversion of triphenylphosphine oxide: 83%.
Yield of triphenylphosphine: 77%.

Example 11

In a glove box, a 50 mL flask containing a stirring bar was charged with 1.39 g (5 mmol) of triphenylphosphine oxide, 2.34 g (10 mmol) of diphenylphosphite, 0.77 g (2.5 mmol) of triphenylphosphite, 20 mL of anhydrous THF and 0.562 g (2.5 mmol) of N-iodosuccinimide respectively. The mixture was stirred at room temperature for 5 h before it was quenched with 0.2 g of $H_2O$.

The reaction mixture was characterized by $^{31}P$ NMR spectroscopy and the conversion and yield were calculated based on the integrals.

Conversion of triphenylphosphine oxide: 92%.
Yield of triphenylphosphine: 91%.

Example 12

In a glove box, a 50 mL flask containing a stirring bar was charged with 1.39 g (5 mmol) of triphenylphosphine oxide, 2.34 g (10 mmol) of diphenylphosphite, 0.77 g (2.5 mmol) of triphenylphosphite, 0.253 g (2.5 mmol) of triethylamine, 20 mL of anhydrous THF and 0.63 g (2.5 mmol) of $I_2$ respectively. The mixture was stirred at room temperature for 5 h before it was quenched with 0.2 g of $H_2O$.

The reaction mixture was characterized by $^{31}P$ NMR spectroscopy and the conversion and yield were calculated based on the integrals.

Conversion of triphenylphosphine oxide: 95%.
Yield of triphenylphosphine: 94%.

Example 13

In a glove box, a 50 mL flask containing a stirring bar was charged with 1.84 g (5 mmol) of tris(4-methoxyphenyl)phosphine oxide, 2.34 g (10 mmol) of diphenylphosphite, 0.77 g (2.5 mmol) of triphenylphosphite, 20 mL of anhydrous THF and 0.63 g (2.5 mmol) of $I_2$ respectively. The mixture was stirred at room temperature for 18 h.

The reaction mixture was characterized by $^{31}P$ NMR spectroscopy and the conversion and yield were calculated based on the integrals.

Conversion of triphenylphosphine oxide: 74%.
Yield of triphenylphosphine: 73%.

Example 14

In a glove box, a 50 mL flask containing a stirring bar was charged with 1.60 g (5 mmol) of tris(4-methylphenyl)phosphine oxide, 2.34 g (10 mmol) of diphenylphosphite, 0.77 g (2.5 mmol) of triphenylphosphite, 20 mL of anhydrous THF and 0.63 g (2.5 mmol) of $I_2$ respectively. The mixture was stirred at room temperature for 6 h.

The reaction mixture was characterized by $^{31}P$ NMR spectroscopy and the conversion and yield were calculated based on the integrals.

Conversion of triphenylphosphine oxide: 88%.
Yield of triphenylphosphine: 80%.

Example 15

In a glove box, a 50 mL flask containing a stirring bar was charged with 1.66 g (5 mmol) of tris(4-fluorophenyl)phosphine oxide, 2.34 g (10 mmol) of diphenylphosphite, 0.77 g (2.5 mmol) of triphenylphosphite, 20 mL of anhydrous THF and 0.63 g (2.5 mmol) of $I_2$ respectively. The mixture was stirred at room temperature for 5 h.

The reaction mixture was characterized by $^{31}P$ NMR spectroscopy and the conversion and yield were calculated based on the integrals.

Conversion of triphenylphosphine oxide: 94%.
Yield of triphenylphosphine: 90%.

Example 16

In a glove box, a 50 mL flask containing a stirring bar was charged with 1.42 g (5 mmol) of cyclohexyldiphenylphosphine oxide, 2.34 g (10 mmol) of diphenylphosphite, 0.77 g (2.5 mmol) of triphenylphosphite, 20 mL of anhydrous THF and 0.63 g (2.5 mmol) of $I_2$ respectively. The mixture was stirred at room temperature for 5 h.

The reaction mixture was characterized by $^{31}P$ NMR spectroscopy and the conversion and yield were calculated based on the integrals.

Conversion of triphenylphosphine oxide: 80%.
Yield of triphenylphosphine: 75%.

Example 17

In a glove box, a 50 mL flask containing a stirring bar was charged with 2.15 g (5 mmol) of 1,2-bis(diphenylphosphinoyl)ethane dioxide, 2.34 g (10 mmol) of diphenylphosphite, 0.77 g (2.5 mmol) of triphenylphosphite, 20 mL of anhydrous THF and 0.562 g (2.5 mmol) of N-iodosuccinimide respectively. The mixture was stirred at 50° C. for 18 h.

The reaction mixture was characterized by $^{31}$P NMR spectroscopy and the conversion and yield were calculated based on the integrals.

Conversion of triphenylphosphine oxide: 90%.

Yield of triphenylphosphine: 60%.

The invention claimed is:

1. A process for the conversion of a tertiary phosphine oxide to the corresponding tertiary phosphine, comprising at least reacting said tertiary phosphine oxide with a phosphite compound, in the presence of at least a catalyst, wherein the catalyst is selected from the group consisting of fluorine ($F_2$), chlorine ($Cl_2$), bromine ($Br_2$), iodine ($I_2$), iodine monochloride (ICl), iodine monobromide (IBr), heterocyclyl halides, haloalkanes, phosphine dihalides, and any trialkyl, cycloalkyl or aryl analogues thereof, and wherein the catalyst loading is comprised between 0.1 and 1 molar equivalents of the tertiary phosphine oxide.

2. The process according to claim 1 wherein the tertiary phosphine oxide is a compound of formula (I) as follows:

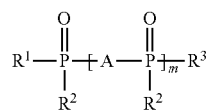

(I)

wherein $R^1$, $R^2$ and $R^3$ are each independently selected from the group consisting of substituted or unsubstituted, branched or linear hydrocarbyl; and substituted or unsubstituted carbocyclyl or heterocyclyl; A is a linking moiety; m is an integer of 0 to 2.

3. The process according to claim 2 wherein each $R^1$, $R^2$ and $R^3$ is independently selected from the group consisting of substituted or unsubstituted $C_6$-$C_{20}$ aryl-$C_o$-$C_{20}$ alkyl and $C_5$-$C_{20}$ heteroaryl-$C_o$-$C_{20}$ alkyl.

4. The process according to claim 2 wherein $R^1$, $R^2$ and $R^3$ are all substituted or unsubstituted phenyl.

5. The process according to claim 2 wherein the linking moiety A comprises substituted or unsubstituted hydrocarbylene or substituted or unsubstituted monocyclic or polycyclic carbocyclylene or heterocyclylene, and optionally one or several functional groups.

6. The process according to claim 1 wherein the tertiary phosphine oxide is selected from the group consisting of: triphenylphosphine oxide, trioctylphosphine oxide, tris(4-methoxyphenyl)phosphine oxide, tris(4-methylphenyl) phosphine oxide, tris(4-fluorophenyl)phosphine oxide, cyclohexyldiphenylphosphine oxide, 1,2-bis(diphenylphosphinoyl)ethane dioxide, 2,2'-bis(diphenyloxyphosphino)-1,1'-binaphthyl, bis(2-(diphenyloxyphosphino) phenyl ether, 9,9-dimethyl-4,6-bis(dipheny loxyphosphino) xanthene, 1,1'-bis(diphenyloxyphosphino) ferrocene, (azanediylbis (ethane-2,1-diyl))bis(diphenylphosphine oxide), tris(4-chlorophenyl) phosphineoxide, bis(2-methylphenyl) phenylphosphineoxide, bis(2-methylphenyl) phenylphosphineoxide, (4-cyanophenyl)diphenylphosphine oxide, and any of these compounds attached to a solid and/or polymeric support.

7. The process according to claim 1 wherein the phosphorus atom of each phosphite function of phosphite compound is linked to groups selected from substituted or unsubstituted, branched or linear hydrocarbyl; and substituted or unsubstituted carbocyclyl or heterocyclyl.

8. The process according to claim 1 wherein the phosphite compound is represented by the formula (II) as follows:

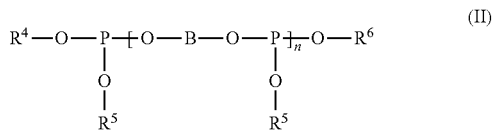

(II)

wherein $R^4$, $R^5$ and $R^6$ are each independently selected from the group consisting of hydrogen, substituted or unsubstituted, branched or linear hydrocarbyl; and substituted or unsubstituted, aliphatic or aromatic carbocyclyl or heterocyclyl; B is a linking moiety; and n is an integer of from 0 to 2.

9. The process according to claim 8 wherein $R^4$, $R^5$ and $R^6$ is independently selected from the group consisting of hydrogen atom, substituted or unsubstituted $C_6$-$C_{20}$ aryl-$C_0$-$C_{20}$ alkyl.

10. The process according to claim 1 wherein the phosphite compound is selected from the group consisting of: phosphorous acid, triphenylphosphite, diphenylphosphite, phenylphosphite, diisodecylphenylphosphite, diphenylisodecylphosphite, disooctyloctylphenylphosphite, phenyldiisodecylphosphite, tris(4-methoxyphenyl)phosphite, tri(o-tolyl)phosphite, tris (nonylphenyl)phosphite, tetraphenyl dipropyleneglycol diphosphite, and 4,4'-isopropylidenediphenol $C_{12}$-$_{15}$ alcohol phosphite.

11. The process according to claim 1 wherein the phosphite compound is present in an amount comprised between 1 and 10 molar equivalent phosphite of the phosphite compound to the phosphine oxide of the tertiary phosphine oxide.

12. The process according to claim 1 wherein the tertiary phosphine oxide and/or the phosphite compound are attached to a solid support.

13. The process according to claim 1 wherein the process is carried out in presence of a non-polar solvent or an anhydrous aprotic polar solvent.

14. The process according to claim 1 wherein the reaction medium comprises water.

15. The process according to claim 14 wherein the reaction medium comprises water with a molar ratio of water to tertiary phosphine oxide comprised between 1/1 and 10/1.

16. The process according to claim 1 wherein the process is carried out in the presence of a base.

17. The process according to claim 16 wherein the base is present in an amount comprised between 0.1 and 2 molar equivalents of the tertiary phosphine oxide.

18. A composition comprising at least: a tertiary phosphine oxide and a phosphite compound, and a catalyst, wherein the catalyst is selected from the group consisting of fluorine ($F_2$), chlorine ($Cl_2$), bromine ($Br_2$), iodine ($I_2$), iodine monochloride (ICl), iodine monobromide (IBr), heterocyclyl halides, haloalkanes, phosphine dihalides, and any trialkyl, cycloalkyl or aryl analogues thereof, and wherein the catalyst loading is comprised between 0.1 and 1 molar equivalents of the tertiary phosphine oxide.

* * * * *